United States Patent [19]
Kawasaki

[11] Patent Number: 5,673,240
[45] Date of Patent: Sep. 30, 1997

[54] SEEK CONTROL CIRCUIT FOR SUPPRESSING VIBRATION OF OBJECTIVE LENS IN OPTICAL HEAD DURING SEEK OPERATION

[75] Inventor: Satoshi Kawasaki, Tokyo, Japan

[73] Assignee: NEC Corporation, Japan

[21] Appl. No.: 616,893

[22] Filed: Mar. 18, 1996

[51] Int. Cl.$^6$ .................................................. G11B 7/085
[52] U.S. Cl. ........................................ 369/44.28; 369/44.32
[58] Field of Search ................................ 369/32, 44.14, 369/44.25, 44.27–44.29, 44.32, 54

[56] References Cited

U.S. PATENT DOCUMENTS

| | | | |
|---|---|---|---|
| 4,837,757 | 6/1989 | Okada et al. | 369/44.14 |
| 5,572,494 | 11/1996 | Nakane et al. | 369/44.28 |

FOREIGN PATENT DOCUMENTS

| | | |
|---|---|---|
| 63-181124 | 7/1988 | Japan . |
| 1-154322 | 6/1989 | Japan . |
| 2-165427 | 6/1990 | Japan . |
| 3-73935 | 11/1991 | Japan . |

*Primary Examiner*—W. R. Young
*Attorney, Agent, or Firm*—Hayes, Soloway, Hennessey, Grossman & Hage, P.C.

[57] ABSTRACT

The seek control circuit for an optical disk device disclosed includes an optical head movement speed detector, e.g., a linear encoder which detects a movement speed of an optical head and outputs an optical head movement speed signal; an objective lens movement speed detector, e.g., a frequency/voltage converter which provides a movement speed of the objective lens based on a tracking error signal during an optical head movement operation and outputs an objective lens movement speed signal; a relative movement speed calculator, e.g., a differential operator which provides a relative speed of the objective lens with respect to the optical head from a difference between the optical head movement speed and the objective lens movement speed and outputs an objective lens relative speed signal; and a vibration controller, e.g., a tracking actuator which controls vibration of the objective lens during the optical head movement operation in accordance with the calculated relative speed. The device thus configured is capable of making a stable seek operation at a high speed and making access to a data at a high speed without requiring a mechanism that adds to the weight of the optical head.

6 Claims, 2 Drawing Sheets

SEEK CONTROL CIRCUIT FOR SUPPRESSING VIBRATION OF OBJECTIVE LENS IN OPTICAL HEAD DURING SEEK OPERATION

BACKGROUND OF THE INVENTION (1) Field of the Invention

The present invention relates to a seek control circuit for controlling a seek operation in an optical disk device when accessing to data in an optical disk for data recording and reproduction, and more particularly to a seek control circuit for suppressing vibration of an objective lens in an optical head during the seek operation of the optical head.

(2) Description of the Related Art

In accessing to data in an optical disk of an optical disk device, an optical head is first cursory moved at a high speed (coarse seek operation) by means of such as a linear motor or feed screw mechanism which moves the optical head in a radial direction of the optical disk and, thereafter, an actuator of an objective lens attached on the optical head is moved under control based on the tracking error signals obtained through a method such as a 3-beam method or a push-pull method so that a beam spot for reading the data in the track on the optical disk is finely positioned (fine seek operation).

In this case, during the coarse seek operation, since a tracking servo is switched off, the objective lens is in a state in which it is held to the side of the optical head only by the force of a holding mechanism such as a leaf spring thus being easily vibrated by the influence of a speed adjustable driving mechanism such as a linear motor. When such a vibration is large, it becomes necessary for the lens to have a settling time, before the tracking servo is switched on, at a position near the target area where the coarse seek operation has ended, and this is a cause for the prolonging of the access time.

In order to overcome the above problem, there are proposals wherein a lens position sensor for detecting a movement of the objective lens is provided inside the optical head, and a servo control is applied to suppress the vibration of the lens with respect to the base of the optical head. Such examples are disclosed in Japanese Patent Application Kokai Publication No.. Sho 58-218053 and Japanese Patent Application Kokai Publication No. Sho 63-181124.

However, in the vibration prevention means for the objective lens of the optical head in the prior art, the position detection means for the objective lens is provided inside the optical head, thus increasing the weight of the optical head and increasing the cost of manufacturing because of the increased assembling steps.

The increase in the weight of the optical head involves secondary problems as it requires the driving power of the optical head to be increased and it causes a delay in the movement speed of the optical head resulting in an increase in the access time.

Therefore, there is a strong desire or demand for the realization of a vibration control means for the objective lens which is capable of suppressing the vibration of the objective lens without a need for providing any special mechanisms for this purpose inside the optical head.

Also, there are other proposals intended for solving the above problem as disclosed in Japanese Patent Application Kokai Publication No. Hei 2-165427 and Japanese Patent Application Kokai Publication No. Hei 1-154322.

In the former, the deviation of the objective lens actuator is detected through the light reflected from a mirror surface of the optical disk, and the vibration of the objective lens is suppressed by feeding-back the detected position signal of the actuator during the seek operation. However, this cannot be applied to an optical disk which does not have a large mirror surface in the disk record surface as in CDs or LDs, and can be applied only to the arrangement wherein the tracking error detection employs a push-pull method. Thus, the shortcoming is that there is a limitation in the application.

In the latter, a part of the tracking drive coil is used as a speed detection sensor for the pick-up head of the objective lens portion, and the objective lens is controlled during the seek operation based on the output of the speed detection sensor. Since the actuator of the objective lens requires a special additional element and is configured so as to have the sensor disposed within the actuator, it is easily affected by a driving current for focusing, tracking, etc., thus raising problems in measurement precision.

SUMMARY OF THE INVENTION

An object of the present invention, therefore, is to overcome the problems existing in the prior art, and to provide an optical disk reproduction device which is capable of making a stable seek operation at a high speed and making high speed access to a data without requiring a mechanism that adds to the weight of the optical head.

According to a first aspect of the invention, there is provided a seek control circuit for an optical disk device having an optical head which includes an objective lens actuator for holding a data recording/reproducing beam spot at a predetermined track position of an optical disk and which is moved in a radial direction of the optical disk by a radial direction movement means, the seek control circuit comprising:

an optical head movement speed detection means for detecting a movement speed of the optical head;

an objective lens movement speed detection means for detecting a movement speed of an objective lens in accordance with a tracking error signal during an optical head movement operation;

a relative movement speed calculating means for providing a relative speed of the objective lens with respect to the optical head from a difference between the optical head movement speed and the objective lens movement speed; and a vibration control means for controlling vibration of the objective lens during the optical head movement operation in accordance with a relative speed calculated by the relative movement speed calculating means.

According to a second aspect of the invention, there is provided a seek control circuit of an optical disk device, which includes a frequency/voltage converter and in which the objective lens movement speed detection means is arranged such that it provides an objective lens speed signal by first binarizing the tracking error signal outputted from the optical head and then making conversion by the frequency/voltage converter.

According to a third aspect of the invention, there is provided a seek control circuit of an optical disk device, which includes a linear encoder for detecting a location of the optical head and a frequency/voltage converter for providing a movement speed of the optical head, and in which the optical head movement speed detection means is arranged such that it provides the optical head speed signal by converting an output of the linear encoder by the frequency/voltage converter.

In the seek control circuit for the optical disk device having the above structure according to the invention, a relative movement speed of the objective lens is obtained based on a difference between a movement speed of the optical head and a movement speed of the objective lens obtained from tracking error signals during the movement of the optical head, and the vibration of the objective lens during the seek operation of the optical head is suppressed based on the relative movement speed.

Also, in the seek control circuit of the optical disk according to the invention, the relative speed of the objective lens with respect to the optical head base can be detected without requiring the provision of a sensor for detecting the position of the objective lens within the optical head and, based on this detection, the servo can be applied so as to suppress the vibration of the objective lens during the coarse seek operation of the optical head. Thus, this enables the provision of an optical disk reproduction device which operates stably for a high speed access during the seek operation and without requiring additional element which increases the weight of the optical head.

The arrangement according to the invention can be employed in a wide variety of optical disks including CDs, LDs and mini-disks, that is, it can be applied to all types of optical disks without limitation in application.

Further, the mechanism such as the objective lens actuator can make use of one conventionally used in an optical disk device as it is. A smaller number of additional or new elements results in cutting down the manufacturing cost. Also, since the speed detection operation is not influenced by a driving current for focusing, tracking, etc., the reliability of the circuit is enhanced.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 1:
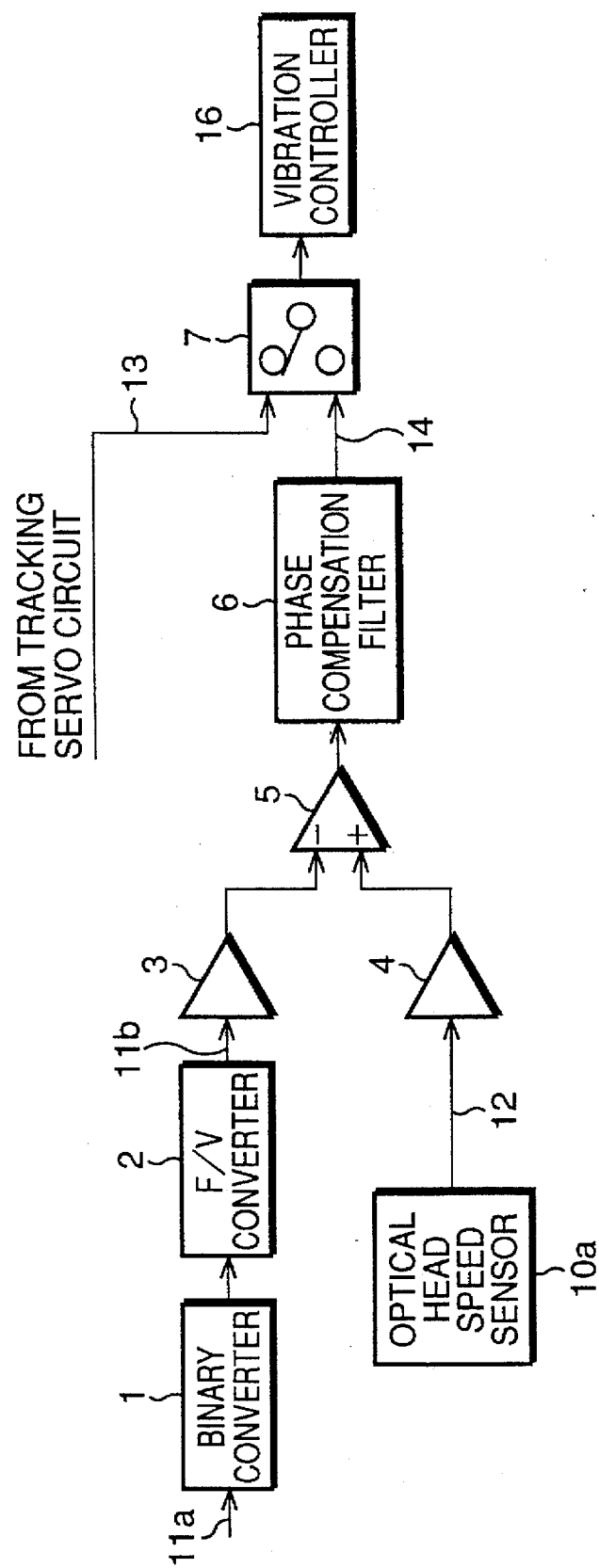
FIG. 1 is a block diagram showing a seek control circuit for an optical disk device of a first embodiment according to the invention.

FIG. 1 shows, in a block diagram, an arrangement of a first embodiment according to the invention.

The optical disk device to which the seek control circuit according to the invention is applied has incorporated, above the optical head, an objective lens actuator for holding a data recording/reproducing beam spot at a predetermined position, and the optical head is moved in a radial direction of the optical disk by a radial direction movement means. The arrangement in this respect is the same as that in the prior art.

That is, the optical disk device is arranged such that, by a linear motor or a feed screw mechanism, an optical head is moved at a high speed in a radial direction of the disk (coarse seek operation), and then an objective lens actuator is moved based on the tracking error signals obtained by a method such as a 3-beam method or a push-pull method whereby the laser beam from the optical head is led to a predetermined track and a sector (fine seek operation) for recording/reproducing data in the optical disk.

In the optical disk device arranged as above, the seek control circuit according to the invention is constituted by an optical head movement speed detection means, an objective lens movement speed detection means, a relative movement speed calculating means, and an objective lens vibration control means.

The optical head movement speed detection means is for detecting a movement speed of the optical head, and may employ various known methods or structures for actual optical head speed sensor 10a, for example, a structure wherein a linear encoder for detecting the position of the optical head is provided in a direction along the movement of the optical head (radial direction of the disk), and the output thereof undergoes the pulse frequency/voltage conversion so as to output a speed signal of the optical head.

The objective lens movement speed detection means calculates the movement speed of the objective lens based on the tracking error signals during the movement of the optical head (coarse seek operation).

The details of the objective lens movement speed detection means are shown in FIG. 1. As shown therein, after the tracking error signal 11a outputted from the optical head is binarized by a binary converter 1, this binary data is converted by the pulse frequency/voltage converter (F/V converter) 2 thereby outputting an objective lens movement speed signal 11b.

The detection of the tracking error signal during the coarse seek operation is made such that, when a laser beam passes across a track on the disk surface, there is a change in the distribution of the quantity of light returned to a split detector and this is detected as a tracking error signal.

The relative movement speed calculating means provides a relative speed of the objective lens for the optical head from a difference between the optical head movement speed obtained by the optical head movement speed detection means and the objective lens movement speed obtained by the objective lens movement speed detection means. This may be constituted by a differential operator 5, as shown in FIG. 1, which carries out a differential operation by receiving an optical head movement speed signal 12 whose amplitude has been regulated by a gain regulator 4 and an objective lens movement speed signal 11b whose amplitude has been regulated by a gain regulator 3.

The optical disk device includes a servo signal switching means which receives an objective lens relative speed signal 14 from a phase compensation filter 6 and a tracking servo output signal 13 from a tracking servo circuit (not shown), and selects and outputs either of these signals. This may be constituted by a servo signal switch 7 as shown in FIG. 1.

The vibration control means is for controlling the vibration of the objective lens, which is in the form of a vibration controller 16 and may utilize a tracking actuator (objective lens actuator) provided in the optical disk device. This vibration control means operates such that, by the servo signal switch 7, a tracking servo output signal (tracking error signal) is selected for the normal tracking control, and the objective lens relative speed signal 14 obtained from the differential operator 5 is selected during the seek operation.

Now, the objective lens vibration control operation during the seek operation according to the invention is explained with reference to FIG. 1.

The tracking error signal 11a obtained during the seek operation of the optical head is binarized by the binary convertor 1, and the resulting binary data is converted by the frequency/voltage converter 2. The voltage outputted corresponds to a speed of the objective lens with respect to the disk surface, and this is inputted to the gain regulator 3 where the amplitude thereof is regulated.

The optical head movement speed is obtained by an optical head movement speed detection means, and this is outputted as an optical head movement speed signal 12 and inputted to the gain regulator 4 where the amplitude thereof is regulated.

The objective lens movement speed signal 11b and the optical head movement speed signal 12 that have respectively been gain-regulated are inputted to the differential operator 5 where the difference therebetween is calculated. From there, the objective lens relative speed signal 14 is outputted as a relative speed of the objective lens with respect to the optical head.

The objective lens relative speed signal 14 is supplied to the vibration controller 16, i.e., the tracking actuator, through the phase compensation filter 6, where the phase is compensated, and through the servo signal switch 7.

The other input terminal of the servo signal switch 7 receives a tracking servo output signal 13 from a tracking servo circuit (not shown). By the servo signal switch 7, a tracking servo output signal 13 is selected under a normal tracking state, and an objective lens relative speed signal 14 whose phase has been compensated is selected during the seek operation.

Where the circuit is configured as above, the relative speed of the objective lens with respect to the optical base can be detected and the vibration of the objective lens can be suppressed during the seek operation without a need for providing any special sensor inside the optical head.

Thus, the settling time of the objective lens after the seek operation can be reduced, thereby enabling the provision of an optical disk reproduction device capable of accessing to a data at a high speed.

Figure 2:
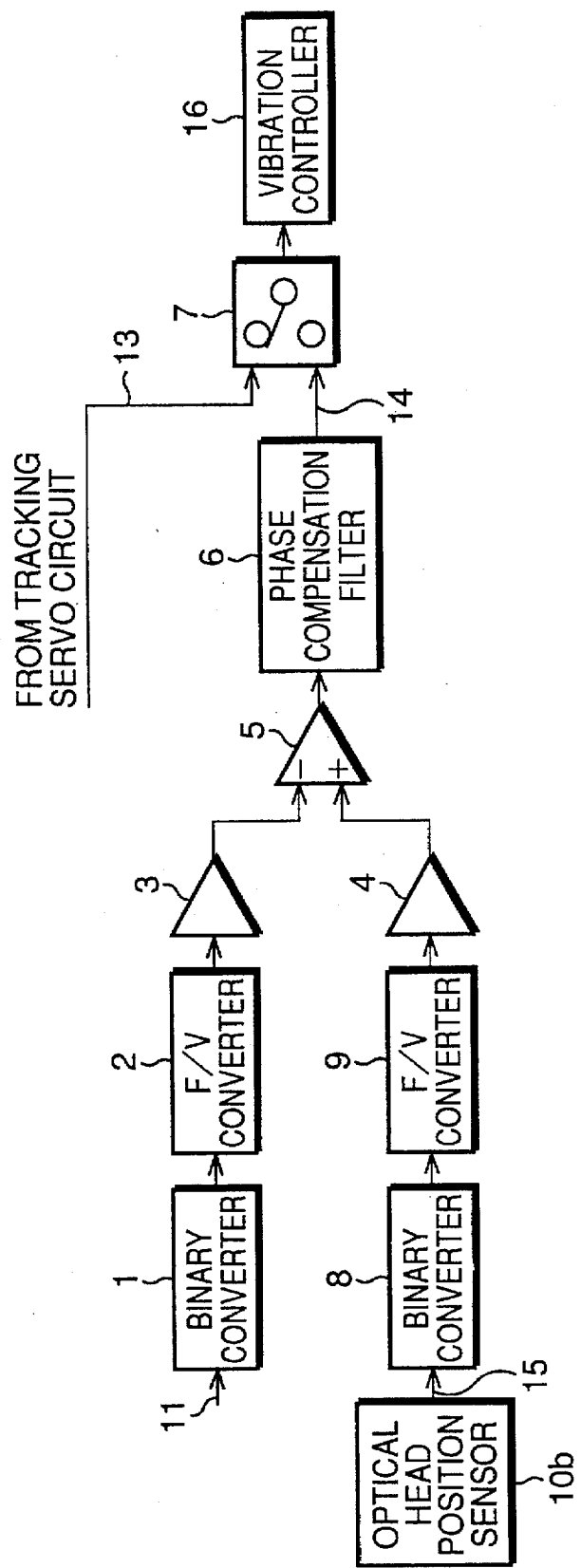
FIG. 2 is a block diagram showing a seek control circuit for an optical disk device of a second embodiment according to the invention.

Now, a second embodiment according to the invention is explained with reference to FIG. 2 which is a block diagram showing the same.

The arrangement in this embodiment differs from that in the first embodiment in the point that the input is made from an optical head position sensor 10b and not from the optical head speed sensor 10a.

As such a position sensor 10b, for example, a linear encoder of an optical type may be used. As shown in FIG. 2, unlike in the first embodiment, there are provided a binary converter 8 and a frequency/voltage converter 9 which operate such that, an optical head position signal 15 outputted from the position sensor 10b is converted to pulses by the binary converting means 8 and then, in the same way as at the side of the objective lens speed detection means, the resulting pulses undergo a pulse frequency/voltage conversion and this provides an optical head speed. Other arrangements are the same as those according to the first embodiment.

While the invention has been described in its preferred embodiments, it is to be understood that the words which have been used are words of description rather than limitation and that changes within the purview of the appended claims may be made without departing from the true scope of the invention as defined by the claims.

For example, the means such as the optical head movement speed detection means or the objective lens movement speed detection means may be other means than those used in the described embodiments, and the detection methods may be other than those described, such as a 3-beam method, a push-pull method, a differential push-pull method, and a wobbling method.

What is claimed is:

1. A seek control circuit for an optical disk device having an optical head which includes an objective lens actuator for holding a data recording/reproducing beam spot at a predetermined track position of an optical disk and which is moved in a radial direction of the optical disk by a radial direction movement means, said seek control circuit comprising:

an optical head movement speed detection means for detecting a movement speed of said optical head;

an objective lens movement speed detection means for detecting a movement speed of an objective lens in accordance with a tracking error signal during an optical head movement operation;

a relative movement speed calculating means for providing a relative speed of said objective lens with respect to said optical head from a difference between the optical head movement speed and the objective lens movement speed; and a vibration control means for controlling vibration of said objective lens during said optical head movement operation in accordance with the relative speed calculated by said relative movement speed calculating means.

2. A seek control circuit of an optical disk device according to claim 1, which further comprises a switching means arranged such that, only during a seek operation, the objective lens relative speed outputted from said relative movement speed calculating means is selectively inputted to said vibration control means.

3. A seek control circuit of an optical disk device according to claim 1, which includes a frequency/voltage converter and in which said objective lens movement speed detection means is arranged such that it provides an objective lens speed signal by first binarizing said tracking error signal outputted from the optical head and then making conversion by said frequency/voltage converter.

4. A seek control circuit of an optical disk device according to claim 1, which includes a linear encoder for detecting a location of said optical head and a frequency/voltage converter for providing a movement speed of the optical head, and in which said optical head movement speed detection means is arranged such that it provides the optical head speed signal by converting an output of said linear encoder by said frequency/voltage converter.

5. A seek control circuit for an optical disk device according to claim 1, in which said relative movement speed calculating means includes a differential operator for providing a relative speed of the objective lens with respect to the optical head.

6. A seek control circuit for an optical disk device according to claim 1, in which said vibration control means comprises a tracking actuator for controlling vibration of the objective lens during said optical head movement operation.

* * * * *